J. A. LITTLE.
Fruit-Gatherer.
No. 46,916.
Patented Mar. 21, 1865.
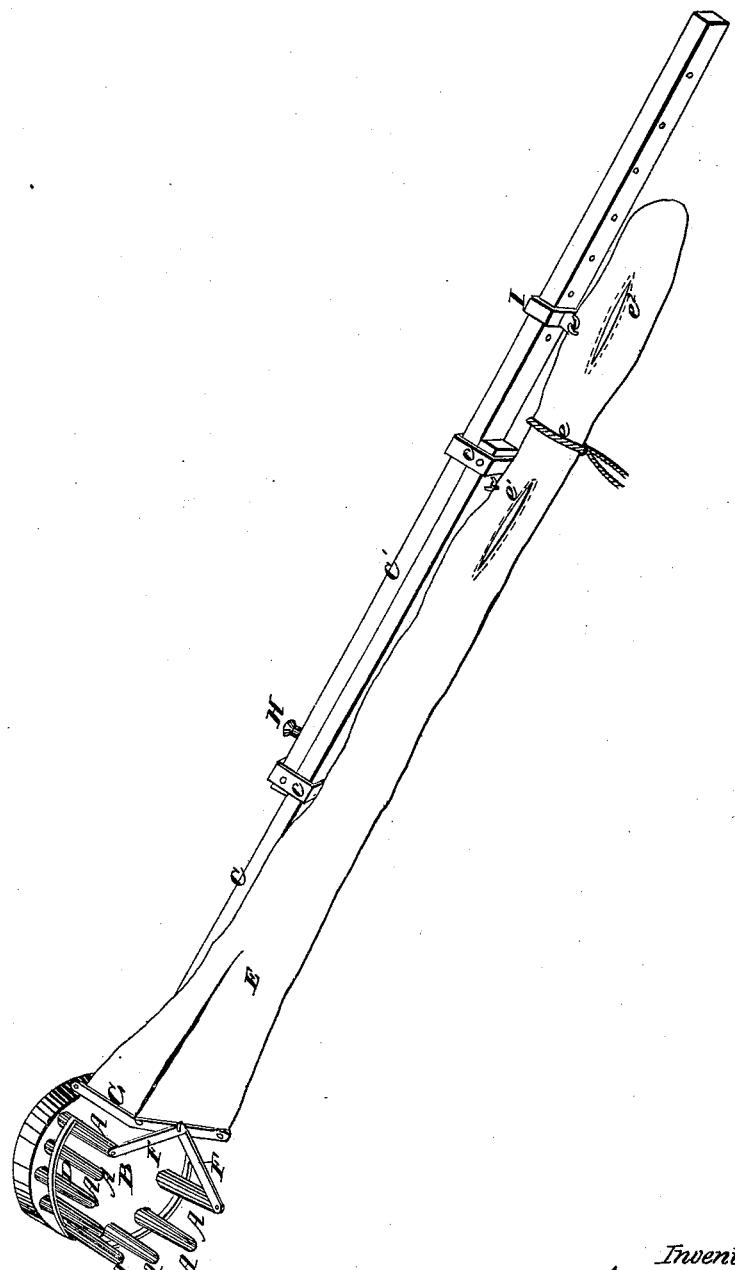

UNITED STATES PATENT OFFICE.

JAMES A. LITTLE, OF DANVILLE, INDIANA.

IMPROVED FRUIT-GATHERER.

Specification forming part of Letters Patent No. 46,916, dated March 21, 1865.

*To all whom it may concern:*

Be it known that I, JAMES A. LITTLE, of Danville, in the county of Hendricks and State of Indiana, have invented a new and Improved Fruit-Gatherer; and I do hereby declare the following to be a full and exact description of the same, reference being had to the accompanying drawing, which makes a part of this specification, and represents a perspective view of my improved fruit-gatherer.

This invention consists in a device having a series of fingers or teeth, similar to those of a rake, disposed in the arc of a circle, and having a knife and conductor or spout wherein the fruit falls on being pulled, and in which it may be allowed to lodge until the spout becomes full, or conducted to a point where it can be conveniently taken out by the hand of the person using the gatherer.

The invention further consists in the employment, in connection with the parts above alluded to, of an extensible rod, permitting the device to be lengthened to suit trees of various heights.

In order that others skilled in the art to which my invention appertains may be enabled to fully understand and use the same, I will proceed to describe its construction and operation.

A A represent a series of fingers or teeth, disposed in the circular form shown, upon the head or piece B, which is attached to the end of the section C of the extensible rod C C'.

D is a knife fixed to the fingers A in any suitable manner, and employed in connection therewith to detach the fruit from the tree.

E represents a spout or conductor with its mouth held in an open condition by means of a metallic strip or retainer, G, which may be braced by the angular knife F F, which is designed to give a draw cut to the stems of the fruit, and thus facilitating its detachment.

The operator or person gathering the fruit is enabled, by means of the extensible rod C C', to raise the fingers A to any point where the fruit may hang, and having placed them in a position to surround or circumscribe the fruit he rakes it into the spout or pocket E, making use of the knives D and F whenever it may be found to facilitate the operation.

A nut-screw, H, serves to adjust or retain the sections of the rod C C' in any position they may be made to occupy relatively to each other. The sections C C' are provided with guides $c$ $c$ to cause them to move upon and in line with each other during the extending or shortening of the rod.

The pocket E is attached near its lower end to a sliding holder, I, down to which the fruit may be allowed to descend in the pocket when the rod is in its most extended condition; but when the rod is shortened in length the fruit in the pocket might interfere with the hold of the operator upon the section C', and, moreover, the fruit could not be so conveniently taken out. I therefore propose to use a cord, $e$, to tie the pocket E at a suitable point above the holder I, and thus intercept the fruit in its descent, so that it may be taken out of the pocket through the opening $e'$, instead of through the lower opening, $e^2$, out of which latter the fruit is taken when the rod is extended.

The manner of using the device is so practically obvious that I will not attempt to give a more extended description.

Having thus described my invention, the following is what I claim as new therein and desire to secure by Letters Patent:

1. The raking device A B, employed substantially in the manner and for the purpose herein explained.

2. The knives D F, employed as accessories to the fingers A in detaching the fruit, as set forth.

3. The extensible rod C C', in connection with the fruit-gatherer, as described, to adapt the device for gathering fruit from different heights.

To the above specification of my improvement in fruit-gatherers I have signed my name this 16th day of January, 1865.

J. A. LITTLE.

Witnesses:
EDWARD H. KNIGHT,
ALEXR. A. C. KLAUCKE.